US009251318B2

(12) United States Patent
Hamilton, II et al.

(10) Patent No.: US 9,251,318 B2
(45) Date of Patent: Feb. 2, 2016

(54) SYSTEM AND METHOD FOR THE DESIGNATION OF ITEMS IN A VIRTUAL UNIVERSE

(75) Inventors: Rick A. Hamilton, II, Charlottesville, VA (US); Michael D. Kendzierski, New York, NY (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 12/553,501

(22) Filed: Sep. 3, 2009

(65) Prior Publication Data

US 2011/0055919 A1    Mar. 3, 2011

(51) Int. Cl.
G06F 17/30        (2006.01)
G06F 21/10        (2013.01)
A63F 13/30        (2014.01)
G06Q 50/10        (2012.01)

(52) U.S. Cl.
CPC ............... *G06F 21/10* (2013.01); *A63F 13/12* (2013.01); *G06Q 50/10* (2013.01); *A63F 2300/5553* (2013.01); *A63F 2300/5586* (2013.01); *A63F 2300/572* (2013.01); *A63F 2300/575* (2013.01)

(58) Field of Classification Search
None
See application file for complete search history.

(56) References Cited

U.S. PATENT DOCUMENTS

| | | |
|---|---|---|
| 5,960,411 A | 9/1999 | Hartman et al. |
| 6,119,229 A | 9/2000 | Martinez et al. |
| 6,694,357 B1 | 2/2004 | Volnak |
| 6,767,287 B1 | 7/2004 | Mcquaid et al. |
| 6,784,901 B1 | 8/2004 | Harvey et al. |
| 7,249,139 B2 | 7/2007 | Chuah et al. |
| 7,298,378 B1 | 11/2007 | Hagenbuch et al. |
| 7,620,630 B2 | 11/2009 | Lloyd et al. |
| 8,099,392 B2 | 1/2012 | Paterson et al. |
| 8,788,952 B2 | 7/2014 | Hamilton, II et al. |
| 2004/0095239 A1 | 5/2004 | Schwartz et al. |
| 2004/0203852 A1* | 10/2004 | Janakiraman ............ 455/456.1 |
| 2004/0266505 A1 | 12/2004 | Keam et al. |
| 2005/0049972 A1 | 3/2005 | Hsu et al. |
| 2005/0223034 A1 | 10/2005 | Kaneko et al. |
| 2006/0004689 A1* | 1/2006 | Chandrasekaran et al. ...... 707/1 |
| 2006/0023626 A1 | 2/2006 | Krausz |
| 2006/0132308 A1 | 6/2006 | Stump et al. |
| 2006/0246970 A1 | 11/2006 | Smith et al. |
| 2007/0201750 A1 | 8/2007 | Ito et al. |

(Continued)

OTHER PUBLICATIONS

Fred Charles et al; "User Intervention in Virtual Interactive Storytelling"; Virtual Reality International Conference, May 16-18, 2001; pp. 1-6.

(Continued)

*Primary Examiner* — Sangwoo Ahn
(74) *Attorney, Agent, or Firm* — Whitham Curtis Christofferson & Cook, PC

(57) ABSTRACT

The present invention enables items in a Virtual Universe to be tagged as available for pickup by one or more designated users. The present invention permits a designated user to be alerted that there is an item designated for that user/avatar and available for pick-up at a location in the Virtual Universe. A user may designate another user (or user's avatar), for example, a minor for whom the designating user has responsibility, as an "item" to be tracked. For privacy and other reasons, this and other features may be implemented on an opt-in basis.

21 Claims, 5 Drawing Sheets

(56) References Cited

U.S. PATENT DOCUMENTS

| | | |
|---|---|---|
| 2007/0293319 A1 | 12/2007 | Stamper et al. |
| 2008/0141147 A1 | 6/2008 | Buhrke et al. |
| 2008/0186183 A1 | 8/2008 | Nagai et al. |
| 2009/0100076 A1* | 4/2009 | Hamilton et al. ............. 707/100 |
| 2009/0112993 A1 | 4/2009 | Miyamoto et al. |
| 2009/0158161 A1 | 6/2009 | Gibbs et al. |
| 2009/0204628 A1* | 8/2009 | Bhogal et al. ................. 707/102 |
| 2009/0210324 A1* | 8/2009 | Bhogal et al. ................. 705/28 |
| 2010/0053187 A1 | 3/2010 | Arrasvuori et al. |
| 2010/0325154 A1 | 12/2010 | Schloter et al. |
| 2011/0055733 A1 | 3/2011 | Hamilton, II et al. |

OTHER PUBLICATIONS

Shichao Ou et al; "An Augmented Virtual Reality Interface for Assistive Monitoring of Smart Spaces", IEEE, Jan. 6, 2004, pp. 1-10.

Shun-Yun Hu et al; Von: A 'Scalable Peer-to-Peer Network for Virtual Environments; IEEE, Jul./Aug. 2006, pp. 22-31.

* cited by examiner

SYSTEM AND METHOD FOR THE DESIGNATION OF ITEMS IN A VIRTUAL UNIVERSE

CROSS-REFERENCE TO RELATED APPLICATIONS

This invention is related to a previous invention by the same inventors entitled "System and Method for Locating Missing Items in a Virtual Universe," U.S. patent application Ser. No. 12/553,432, entitled "System and Method for Locating Missing Items in a Virtual Universe" which is fully incorporated herein by reference.

FIELD OF THE INVENTION

The present invention generally relates to the production and management of interactive virtual universes presented to users on computers linked by a network and, more particularly, to designation of items such as objects and avatars for which a user is responsible in regard to interactions other avatars may have with them.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet has also allowed interactive participation in the same game simultaneously or at will by numerous participants.

As a synthesis of such games with other capabilities of the Internet such as interactive chat rooms, advertising and marketing and access to massive amounts of information and the like, so-called Virtual Universes (sometimes referred to as "metaverses" or "3D Internet") have been developed and made available to the public in recent years.

A Virtual Universe is a computer-based simulated environment intended for users thereof (referred to as "residents" or "agents") to inhabit, traverse and interact through the use of avatars. An avatar, in the context of a Virtual Universe, is a graphical representation of a user which has an appearance that is freely selectable that the user can control and other participants can see, often taking the form of a cartoon-like human which can move through the regions of the Virtual Universe represented by 3D graphics and landscapes which may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment. LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the Virtual Universe and which may impose a charge for participation as a resident, to establish a particular object or environment (sometimes referred to as an "island") within the Virtual Universe, present advertising and the like or combinations thereof. In short, an avatar controlled by a resident can interact with other avatars, objects and portions of the immediate environment of the avatar in much the same way a person would interact with other persons, objects and portions of the environment in the real world but where transportation between portions of the Virtual Universe may be nearly instantaneous (e.g. referred to as "teleporting") and objects and local environments within the Virtual Universe may be entirely developed at will to resemble the real world closely, not at all or with any degree of realism or fantasy in between which may be provided by the administrator of the Virtual Universe or users of the Virtual Universe, often for a not insubstantial fee. Further, once such objects or local environments become part of a Virtual Universe, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

SUMMARY OF THE INVENTION

It is therefore an object of the present invention to provide a Virtual Universe with the ability to tag items in regard to a desired disposition thereof (e.g. available for pickup, providing permissions and prohibitions in regard to an item selectively for particular avatars, providing information in regard to an item and the like) by a designated user. The present invention thus facilitates the tracking and recovery of items and provides a means for a user to leave an item for a designated user to pick-up without requiring the two users to be at the same place at the same time as well as, if desired, placing restrictions on or providing information in regard to items an avatar may place at a location in a VU.

The present invention permits a designated user to be alerted or notified that there is an item tagged to the designated user that is receivable by the designated user at a location in the Virtual Universe. A user may designate another user as an "item" to be tagged. (As discussed above, the generic term "item" is being used to be inclusive of at least both objects and avatars.) For privacy and other reasons, this and other features making use of the present invention may be implemented on an opt-in basis.

A user who has been designated in regard to an item may discover the item (and/or the fact of the designation of the item) either via notification or by seeing the designation upon coming into proximity to the item. The latter may be accomplished by a sign or by information (including, but not limited to, information on a user's permissions or lack of permissions) made visible when a user clicks or hovers his or her mouse over the designated item.

Notification preferences may be set, and this may permit various levels of granularity, such as: (i) allow or disallow email notification, (ii) notification at log-on, (iii) pop-up alert notification, or (iv) any other form of notification that may be implemented. Notification preferences may be further responsive to, a user's efforts to establish notification options, such as by allowing a family member to notify via all options while non-family members are able to notify only via notification at log-on. In addition, notifications may or may not be repeated periodically and may or may not be sent or copied to another designated user. Any alternative notification convention may be employed. Furthermore, upon receipt of a notification, subject to appropriately set user opt-in privacy permissions, a designating user may be alerted that a designated user has received notification of the designation. Further conventions may or may not include the ability of a designated user to communicate some information back, such as "no thanks" or "I'll pick it up hopefully by tomorrow."

The graphic rendering of an intentionally-left item may vary based a user's entitlement to the item. A user with an entitlement to pick up an intentionally-left item may, by way of example and not limitation, receive an additional rendering graphic layer, such as a hovering sign above the item pointing toward it with a message like "For you." Additional information may also be provided, such as who left a particular item, when it was left, where it was originally left, and any text the user who left the item may have provided. Such as instructions for interaction with the item.

By contrast, a user lacking an entitlement or permission to pick up an item may, by way of example and not limitation, receive an additional rendering graphic layer, such as a hovering sign above the item pointing toward it with a message like "Not for you." Additional information may also provided, such as who left the item, when it was left, where it was left, who it is designated for, and any text the user who left the item may have provided, such as contact information. Administrator-defined text, such as Virtual Universe rules and warnings against theft, may also be provided.

Various interface conventions may be used and various operations may be performed, as discussed above. The designated user may or may not be allowed to refuse a designation. If refusal of a designation of an item is permitted, the result might be, for example, deletion of the designation record resulting in, for example, return of the item to the designating user's inventory, or concealment of the item from view by non-designated users (potentially including geometries that might otherwise cause other avatars to bump into or touch the item). Thus, if a designated user makes a refusal of designation with regard to an item for which the refusing designated user is the sole or last-remaining designated user, the refusal may result, not only in notification of refusal to the designating user, but also in return of the item to inventory or concealment of the item from view, as discussed above. Alternatively, if the sole or last-remaining user for which an item has been designated does not pick up the item within a specified time interval, the result may be, not only notification of refusal to the designating user, but also return of the item to inventory or concealment of the item from view, as discussed above.

Further granularity in permission relating to an item may be applied, such as (i) tagging an item for any user to pick up without specifying a particular user or (ii) tagging an item for any user to pick up, as above, in combination with a designation giving preference to a specific user who will have more permission than other users. Furthermore, item-pick-Lip permission given to an unspecified, non-preferred user may include restrictions or limitations not present in the item-pick-up permission given to a specific, preferred user. By way of example and not limitation item-pick-up permission given to an unspecified, non-preferred user may limit the area within which the item may be moved, which may, by way of example and not limitation, be defined in terms of distance (radius) from the item's original drop point that the item may be moved by a non-preferred user. Item-pick-up permission given to an unspecified, non-preferred user may or may not limit the duration of time for which the item may be held by a non-preferred user. Item-pick-up permission given to an unspecified, non-preferred user may or may not further include a limitation on acceptable actions that can be performed on the item, which may enable a designating user (i) to prevent a non-preferred user from placing a designated item, even temporarily, in the non-preferred user's inventory or (ii) to prevent a script associated with a designated item (such as, for example, a script giving an item animation or abilities) from being executed by a non-preferred user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Such Virtual Universes do not, however, permit the items to be designated as available for pickup only by a designated user. Thus, an "item" which an avatar or user can own (or for which an avatar is otherwise responsible which may include other avatars as well as objects) that is lost or dropped in a Virtual Universe may be picked up by another user and moved, vandalized or added to the inventory of that user or avatar. Similarly, an item may be stolen from a user's inventory if another user is able to obtain access to the object. Furthermore, the exchange of items in a Virtual Universe must be done avatar-to-avatar on a synchronous basis requiring both avatars to be in substantially the same location at the same time because a user cannot leave an item and designate it to be picked up by another user's avatar at a later time.

Understanding the following terminology is important for the correct reading of the following description of the invention:

The generic term "item" refers to both objects and users (or avatars of users) for which a particular avatar may be responsible such as by ownership or other relationship to that user.

A standardized identifier, such as Universally Unique Identifiers (UUIDs), is used to create items, assets, avatars, the environment, and anything visual. Use of a standardized format for identifiers enables information to be combined into a single database without a need to resolve name conflicts, textures (which may be distributed to users as graphics files such as JPEG2000 files), and/or effects data (which may be rendered by a user's client according to the user's preferences and device capabilities).

An alert in a Virtual Universe is a graphical or text-based alerting system that may be sent to registered virtual users and/or to registered virtual users in a certain proximity to the lost or missing item.

In some cases, a registered virtual user may receive all alerts regardless of physical location and proximity.

In some cases, an ordinary virtual user may receive alerts only if certain specified criteria are met.

Virtual Universe administrators have responsibility for managing the functionality, conditions and resources within a particular Virtual Universe.

Multiple Virtual Universes may include a Virtual Universe partnering and sharing data and information with other Virtual Universes. Such Virtual Universes may be operated by different companies but nonetheless managed to permit interaction between them.

An allowed list or blocked list may be used by a Virtual Universe to allow items to be designated only by certain users. This may be useful, for example, to prevent spamming. An allowed list may be used for authorizing access and a blocked list may be used for de-authorizing access within a Virtual Universe.

Figure 1:
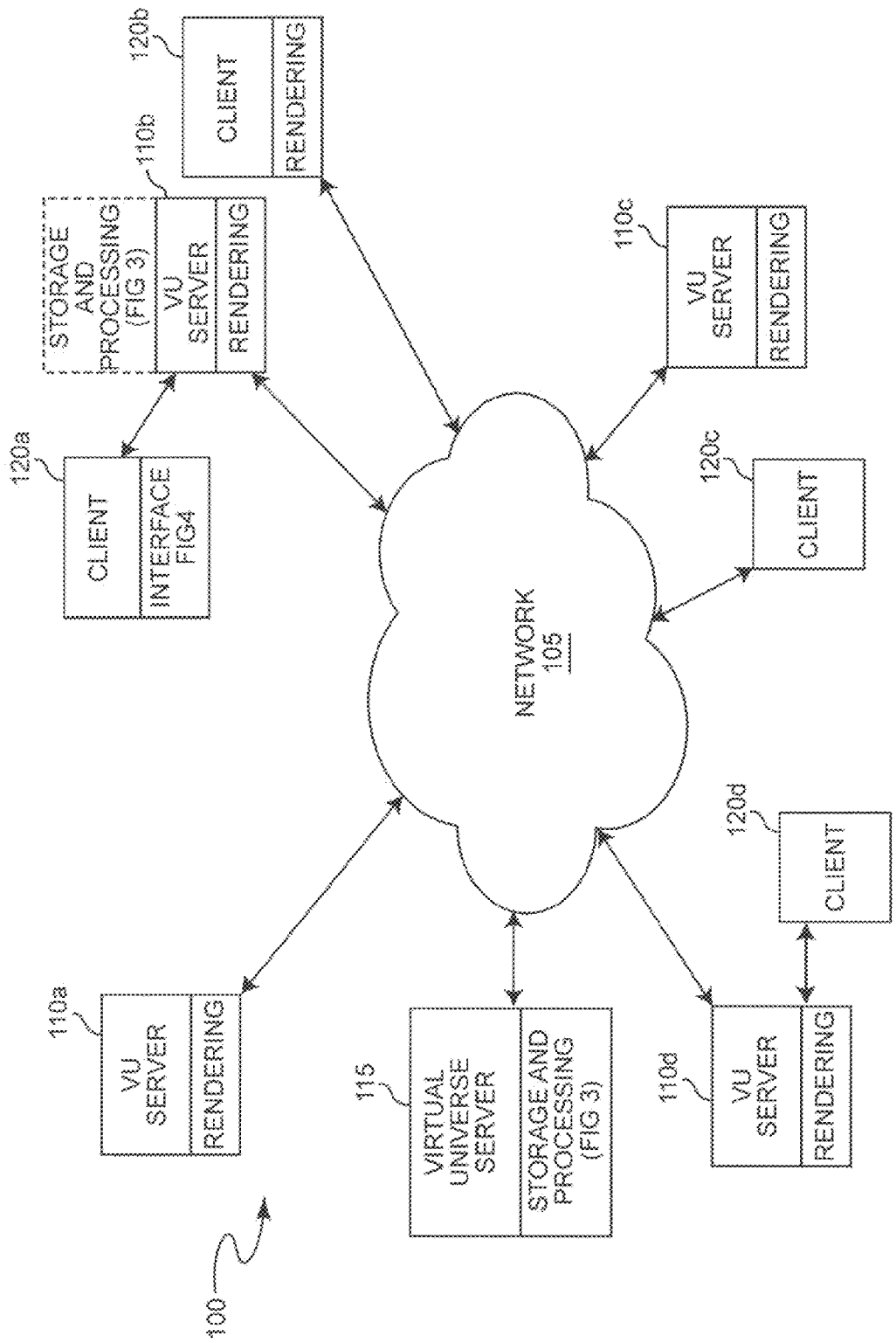
FIG. 1 is a high-level block diagram or data flow diagram of a network-based Virtual Universe.
Figure 2:
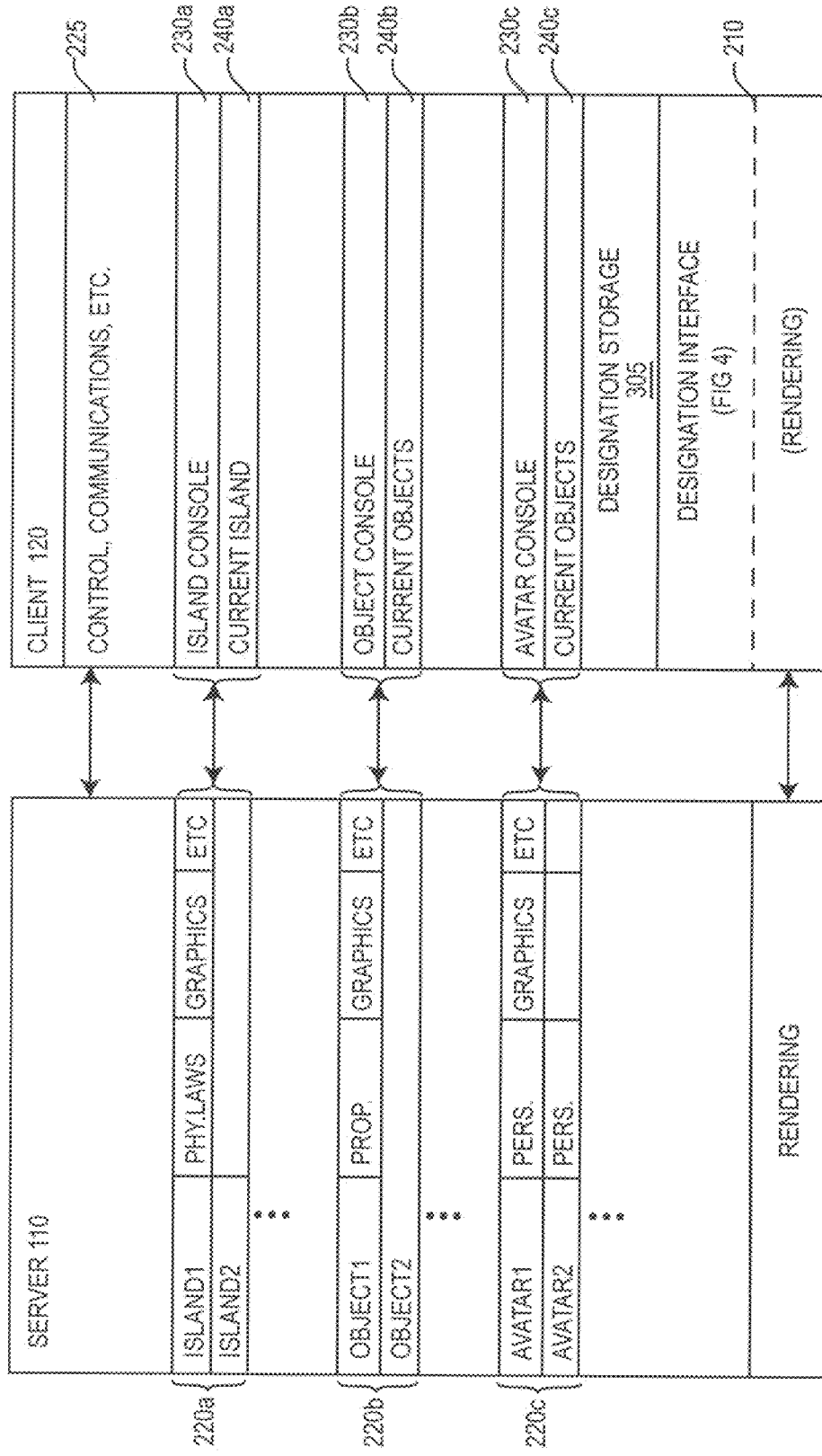
FIG. 2 is a similarly high-level block diagram of some details of the client 120 and server 10 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the high level of abstraction with which a VU is represented in FIGS. 1 and 2, these figures are intended principally to convey a general understanding of a VU and its general operation and preferred logical placement therein of functional elements by which the invention is implemented. Therefore, no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof. The rendering or partial rendering is then distributed in some form to the terminals through which residents interact with the VU where rendering is often completed by application of textures and the like which may be more efficiently communicated as files and locally applied to a partial (e.g. wire-frame) partial rendering.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations generating surface textures, generating lighting and shading effects and their interactions between objects and the like to constrict a scene and as such constitutes a substantial processing burden. As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Figure 5:
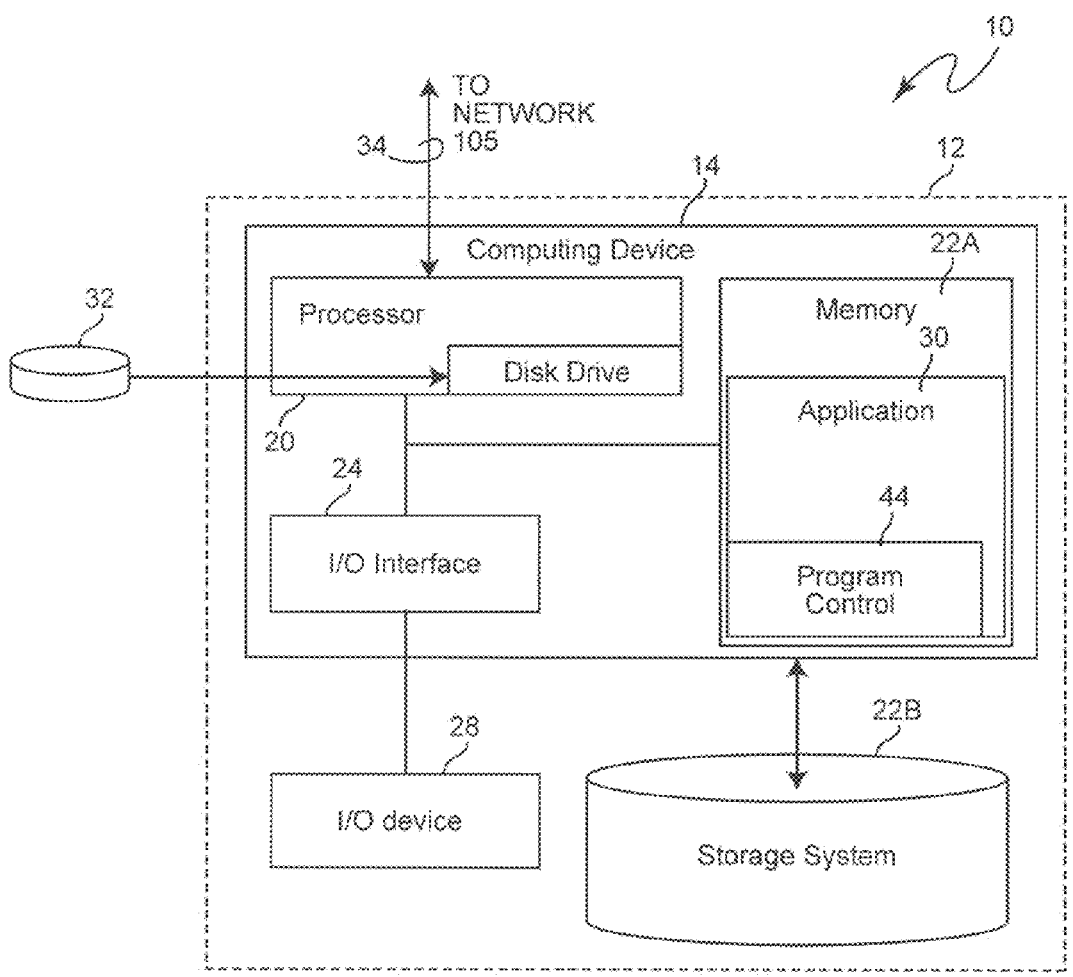
FIG. 5 is a schematic illustration of a computer or terminal architecture suitable for practice of the invention.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 5 and discussed below.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for rendering to be done most expeditiously. For example, when rendering is required at, for example, client 120a for interaction of a particular avatar with an object while changing location on an island, the rendering (including occlusion or hidden line processing) could be performed at the local server 110b or distributed over any or all of servers 110a-110d and possibly even including some client terminals (e.g. 120b) having rendering capability depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering to the network or a local client from a server (e.g. as primitives and geometric coordinates or even compressed video or graphics primitives which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and/or VU server 115 and transmitted as such to the processor(s) which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor. In order to create islands, objects and avatars, some arrangement for doing so, preferably a graphic user interface (GUI) which may be in the form of one or more screens (possibly nested) functioning as a console 230a-230c may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220a, 220b and 220c for islands, objects and avatars, respectively. Similar GUIs 240a-240c are also provided (but preferably resident on the client processor) for control of the current island, object and/or avatar, once it has been created. Suitable arrangements for providing GUIs or consoles 230a-230c and GUIs 240a-240c are known and others providing enhanced user/resident conveniences are foreseeable. The current island (220a) with its associated objects (220b) correspond to the current location of the current avatar (220c) and are thus the object of teleportation or relocation invitations to which the present invention is directed for management thereof as will now be discussed.

Some further definitions which will be helpful in the following discussion are:

1. Avatar—an avatar is a graphical representation the user/resident selects that others call see, often taking the form of a cartoon-like human but which can be produced with any degree of detail, whether realistic or fanciful;

2. Agent—an agent is the user's account, upon which the user/resident can build an avatar and which is tied to am inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user (much in the manner of a "bookmark" in the Internet) and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

It should also be appreciated that the properties, characteristics and behaviors of objects, avatars and islands, once created and made part of a VU are, thereafter, intrinsic to the object, avatar or island and seldom changed although such change is possible. It may be useful to visualize the invention as providing for additional properties and behaviors of both objects and avatars (and, potentially, even islands) which are not intrinsic, as such, but may be broader in scope, more or less persistent and definable, at will, by the user/resident or a corresponding avatar which owns or is responsible for them. Such additional designated properties and behaviors, hereinafter collectively referred to as designations, are expected to be and have been found to be substantial enhancements to the interactions of avatars with the items and each other which are supported by known virtual universes.

Figure 3:
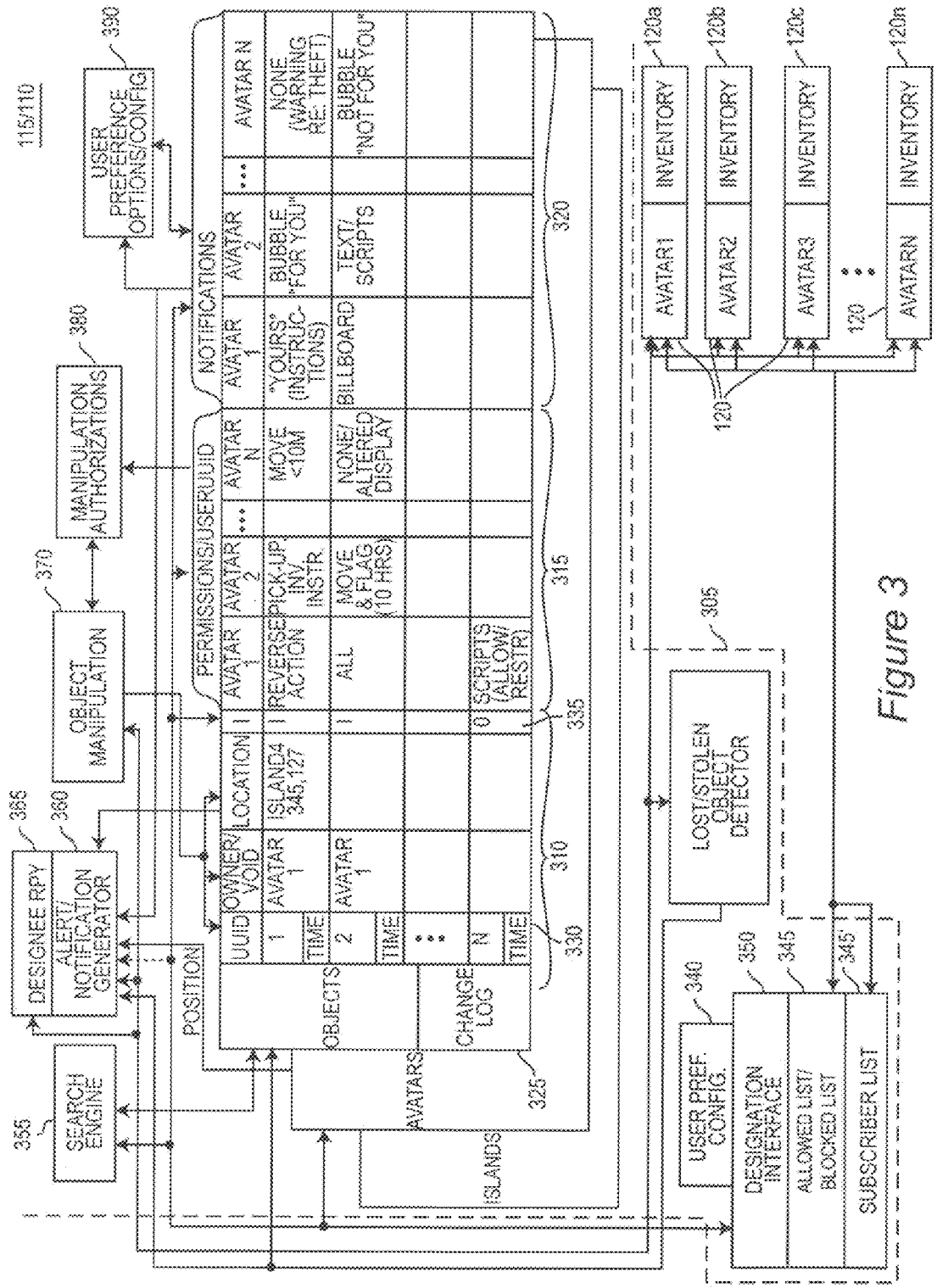
FIG. 3 is a block diagram of an exemplary architecture for storage and processing to support the desired functions of the invention.

More specifically, the invention principally provides for storage, processing and administration of these additional designated properties and behaviors of objects, avatars and even islands. An exemplary architecture for performing these functions is illustrated in FIG. 3. As shown in FIG. 1, the constituent elements of the architecture of FIG. 3 may be conveniently provided in the virtual universe server 115 but may be divided between virtual universe server 115 and a VU server such as 110b. While some marginally additional processing and communications may be required, provision of the designation storage 305 in a VU server (e.g. 110b) local to the particular user as illustrated in FIG. 2 with mirrored and synchronized storage at virtual universe server 115 and distribution of processing as may be most convenient may be the most nearly ideal implementation but is not necessary to the successful practice of the invention in accordance with its most basic principles:

Central to the architecture of FIG. 3 is designation storage 305. This storage may be of any desired construction or configuration but is preferably content addressable. A "flat" organization is suitable for practice of the invention and is so illustrated in regard to objects for clarity but with similar "planes" for avatars and inlands for generality but other organizations may be preferable in some implementations. (It should be understood that in the following discussion, references to an "object" or "objects" is equally applicable to an avatar or island in a respective plane if a designation of an avatar or island has been made.) Alternatively a plane could be provided for "items" including both objects and avatars for which another avatar is responsible and a second plane for miscellaneous designations such as a region where different physical laws might apply for particular avatars. (Essentially as illustrated, each plane of designations is a large matrix or database table(s) with objects in rows and particular designation information in columns.) For clarity, the designation information is grouped into three categories of information indicated by brackets 310, 315 and 320 and a change log 325.

Group 310 is basically metadata concerning the objects for which a designation has been provided including its UUID, the owner (or person responsible for the object, hereinafter collectively included within the term "owner") and its current location. This information basically mirrors metadata maintained, for example, in VU server 110 as described above, for objects/items for which designations have been made but may differ therefrom in accordance with a designation made and will be persistent during the period that the designation is effective. For example, ownership may be relinquished either absolutely or for a period of time by voiding the ownership field or flagging the ownership field as alterable (e.g. by an arbitrary avatar including the original owner) as may be appropriate to the intentions of the original owner. In addition, it is preferable to provide for storage of a time 330, such as an expiration time, associated with the designation and an intentionality flag 335 to indicate if the current location of the object/item, if different from the location of the avatar which owns or is responsible for the object/item, is intentional or not to assist in determination of whether or not an object/item is lost or has been stolen, as distinct from being intentionally left behind when the avatar changes location such as where an avatar may wish to leave an object at a location to observe interaction of other avatars therewith but to recover the object at a later time or automatically at a particular time 330.

Group 315 is designation information specified by the owner in regard to particular restrictions imposed or permissions granted in regard to the object/item for particular avatars or groups thereof (e.g. default restrictions for which a designation is not specified, an allowed list or blocked list of avatars or the like). In general, a designation will be made for only one avatar or group or a small plurality thereof with other avatars having a common default or other basic group of permissions and restrictions. (Such default or basic group of permissions and prohibitions may be specified by a user/resident but it is preferable that at least one basic default set of permission and prohibitions be provided as an administrative preference. For that reason, it is immaterial whether a default is deemed to be invoked by an absence of designated permissions and prohibitions or as a designated set of permissions and/or prohibitions for avatars for which no other permissions or prohibitions are affirmatively set by a user/resident.) For example, the owning avatar may designate that only certain friends may even see the object/item. In general, permissions and prohibitions may include (without restriction) any or all of reversing the designation, limitation of distances or a duration during which an object can be moved, whether or not a display of the object can be altered and scripts which may or may not be allowed to be run in regard to the object such as for animation or morphing of the object.

Group 320 is a similar array of designation information but in regard to the mode and language of notifications in regard to an object for which a designation has been made. In general, such information will indicate a preferred or specific form of notification (e.g. a bubble, hovering sign, nearby billboard or the like) including conditions (e.g. proximity, time, log on/log off or the like) under which the notification is to be made, an indication of permissions and/or restrictions, instructions for the designated avatar to follow, warnings regarding theft, designated or intended ownership and the like.

Thus, in the form illustrated in FIG. 3, a row of designation memory 305 forms a metadata identifier for an item which specifies, in addition to other metadata of that item, its UUID, its ownership (if any), its current location (e.g. where it is dropped or the location to which it may be moved thereafter), and permissions and notification methods for respective individual avatars or groups of avatars with any desired degree of granularity or specificity as well as information to be delivered with either notifications or permissions. Additionally such a unique identifier, regardless of how it is configured, can provide for expiration of a designation at a given time or after a given duration and the specification of actions that will occur upon such expiration. For example, if as illustrated in FIG. 3, avatar 1 owns an object with UUID=1 and "reverse action" is specified as a permission for avatar 1, upon expiration of the designation, the dropping of the item and its corresponding designations will be voided and the item returned to the inventory of avatar 1 while before expiration of the designation, avatar 1 has the permission to take the same action manually. Further, by accessing the item through the UUID in the metadata identifier, changes in the location or any other permitted changes to metadata of the item may be tracked.

A change log 325 is also preferably provided to track and time stamp changes in the stored designations in order to, for example; return items to the owners or previous owners inventory upon expiration of the designation. The change log is also important to functions of reversing a designation, altering a designation by a designee if permitted by the designating user, declining of a designation by a designee, taking remedial action for vandalism or destruction of an item, discriminating lost or stolen items and the like.

More generally, the preferred embodiment of the present invention employs relational tables to constitute designation memory 305 for performance and organization reasons. A field may contain different data for different users to allow an item's owner to establish granular permission on a designated-user or user group basis or on an all-user basis. As a result, one permission set (and therefore one record or record series in the database) is established for User A/avatar 1, while another permission set may be established for User B/avatar 2 and, perhaps, a different permission set may be established for all other users (e.g. avatar N). In the preferred embodiment, if a designated item does not have an all-user permission set, then only designated users will be eligible to pick up the designated item.

A table or equivalent storage area (such as additional fields in an existing table) is made available to store an item's designation information. This table should contain at least the following fields as are depicted in FIG. 3 as described above:

A field to store the identifier of the item.
The identifier of each designated user or users.
The identifier of the owning user (unless already available by a join to an existing table based on the identifier of the item).

Additional fields may be made available to provide additional functionality, including (as depicted in FIG. 3 and described above) but not limited to:

Location coordinates of where the item was originally left by the user.

A time stamp of when the item was left (e.g. a change log).

Text field(s) for the user to give a description or instructions.

Text field(s) for the user to include words that will appear on a sign above the asset (and may be granular such as different text that will be visible to different users).

A distance from origin coordinates where the item may be moved.

A time duration from pick up to put down.

identifier(s) of any scripts associated with the item to be allowed or restricted.

Notification options, which may be restricted or otherwise overridden by designated user's preferences.

A time stamp at which point the designation will expire.

Any of the foregoing fields may be implemented in a single flat table or split into relational tables such as memory 305 as discussed above.

Some of the fields identified above may be established automatically based on a user or administrator's established preferences, which may be stored in another database table 340 such as an addition to a user's preferences, or some or all preferences may be stored in a database or configurations file local to the user's Virtual Universe Client. Such preferences may or may not be enforced and may or may not be editable by a user, which could include preferences established by an administrator. By way of example and not limitation, preferences set by a designated user or an administrator could include the following:

Whether to allow or disallow participation in the designation of items (e.g. service subscriber/opt-in list 345')

Whether to allow or disallow participation in the designation of items based on an allowed list or blocked list For example, some users may pay to permit only certain specified other users to designate an item to them as designee (which would be potentially useful against spammers designating items that are little more than advertisements).

User Interface

Figure 4:
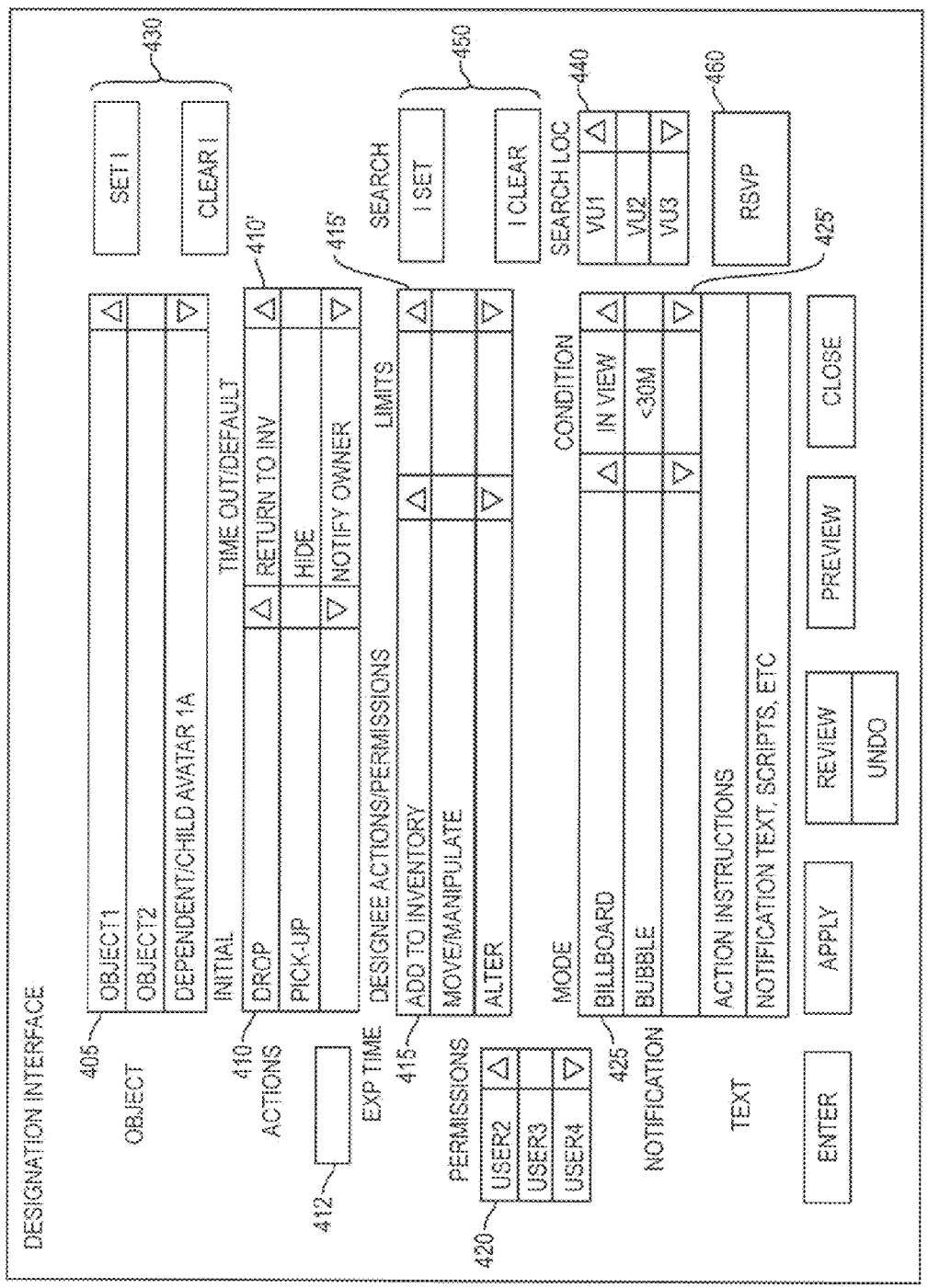
FIG. 4 is a preferred interface screen for entering designation information for an item is a high-level block diagram or data flow diagram of a network-based virtual universe.

A user seeking to designate an item according to the present invention will need an interface in order to organize and systematize the population of designation information into memory 305. The interface may take on any appearance, such as an in-line box with fields, a pop-up window, a "wizard" with multiple screens that guides the user through the fields, a command-line interface, voice command interface, or any other interface conventionally known for user/computer interaction. An exemplary interface screen is illustrated in FIG. 4 that comprises a collection of ordered and scrollable menus and control buttons.

All data which is (i) retrieved from user preference configuration memory 340 for use in the interface, (ii) edited by the user in the interface or other process (such as preferences established automatically by the user in a Virtual Universe Client or in a Virtual Universe Server's database), and then (iii) saved will be inserted, queried, and updated in the designation memory 305 described above which may be embodied as a Database Table Addition component by providing additional fields at 220a-220c as alluded to above. The following are the details of this component:

Using the interface described above, a designating user selects and then designates an item owned by the designating user.

This may be done, for example, by clicking an item in their inventory which may be displayed using menu 405, or removing and holding an item from their inventory, and then clicking a button or selecting an action from a menu on their VU Client to instruct the VU Server to invoke the user interface. In some embodiments, this component may be invoked automatically or with a prompt when the user drops an item as may be selected from menu 410.

An interface to provide more information about a designated item may be brought up for the interface screen of FIG. 4, such as menus 415, 420 and 425 by the Virtual Universe client, enabling the designated user to add or modify properties of the designation in regard to particular users/avatars in accordance with the required and optional fields described in the designation memory/Database Table Addition component.

The interface preferably supports setting and clearing of an intentionality flag, I, (e.g. by buttons 430 and to search particular locations (e.g. through menu 440) and using the intentionality flag using buttons 450.

The interface also preferably provides for request of an acknowledgment when a notification has been received (460)

The interface may selectively enable the designating user to save (e.g. enter or apply) or cancel (e.g. "undo") the designation.

Further options may include saving as a draft, auto-saving, and/or saving as a template for future designations (e.g. "apply")

The interface enables the designating user later to remove or edit the designation (e.g. preview, review, undo).

Some embodiments may, if the designating user later picks up a designated item, automatically remove, or prompt the designating user to remove, the designated item's designation record. In some embodiments, the user may invoke the User Interface again to edit or remove the designation.

Following designation of a designated item, the user then designates an avatar or avatars (or a user name or names) with reference to which the designation is made, preferably through use of menu 420. In the Virtual Universe grid database, the UUID identifier of the item, and the avatar or avatars (or user), are recorded. In the simplest embodiment, this tagging system will enable users to leave items for other users in an open domain. With the described tagging system, only the avatar specified in the tag may take the item from the location in which it was deposited. Once the prospective user with matching identifier locates the item, the user may manipulate or place the item in their own inventory, if permitted, using an interface substantially similar to the interface of FIG. 4 but without some of the menus which would be inappropriate to the actions which are permitted under the existing designation.

Upon the saving of a designation relating to a specified designated user, the designated user is notified of the designation via the User Interface. Any form of notification known in the field of computer notifications may be employed. Notification will be done according to the notification preferences and selections established by the designating user and the designated user preferably through menu 425. Notification may be made either immediately or at a later time. In addition to the techniques already discussed, notifications may be repeated periodically and may be sent or copied to a user other than the designated user or designating user. Any notification convention may be followed. Furthermore, upon the designated user's receipt of a notification, subject to the designated user's permission, the designating user may be alerted that the designated user has received notification of the designation.

Further conventions such as the ability of the designated user to communicate some information back to the designating user, such as "no thanks" or "I'll pick it up hopefully by tomorrow" may be included, regardless of whether such communication is sent with the receipt or as a separate option.

The designated user may or may not be allowed to refuse a designation. If refusal of a designation is allowed, however, the result would be deletion of the designation record from the Database Table Addition, with optional notification of refusal to the designating user. If the refusing designated user is the only designated user, such refusal may result simply in notification of refusal to the designating user or may optionally result in (i) automatic return of the designated item to the designating user's inventory or (ii) concealment or hiding of the designated item from view by or interaction with other users (including geometries that might otherwise cause other avatars to bump into or touch the item). Similarly, the failure of a designated user to pick up an item within a specified period of time may also result in notification and/or return or automatic concealment of the item. The period of time may be established in the designation memory 305 or Database Table Addition by use of menus 415' and/or 425', or it may be an administrator setting. In the preferred embodiment, notification of such expiration or refusal may be made known to the designating user as a pop-up notification.

In some embodiments a fee may be charged to use the item designation services described herein. Such fee may be charged on a per-use basis, as a recurring service fee, or as a one-time or lifetime fee for use of the service.

Returning to FIG. 3, the operation of the invention will now be discussed. It is assumed for purposes of the following discussion that avatar 1 through avatar n 120 correspond to different users and at least some are currently active and controlled from different client terminals 120a-120n and corresponding inventories belonging to respective avatars suitably stored in connection therewith. It is further assumed for purposes of this discussion that avatar 1 will leave an item in a location in a VU designated unconditionally for avatar 2 and, conditionally, for avatar 3, but to the exclusion of other avatars.

To designate an item avatar 1 transmits a message indicating a desire to do so which is, in effect, a request for an interface such as that of FIG. 4, described above. This request and the user identification of the user may be checked against a blocked list which indicates users who are prohibited from designating items and/or a subscriber list of persons who are registered to receive the designation service provided by the invention. In this regard, it is preferred that the operational aspects of the invention are embodied as software, portions of which can be downloaded to configure servers and client terminals as may be needed to provide additional memory fields and various functional elements which will be described below. Thus, the function of downloading the software to be used by a VU resident provides a convenient basis for administration of use of the invention and the assessment of charges for its use.

Assuming that the user is allowed to use the invention, a designation interface is configured in accordance with user preferences stored at 340 and an interface of the desired configuration is built at 350 and transmitted to the client terminal associated with avatar 1 and access is provided to search engine 355. Search engine 355 will then conduct a search to find the storage location for the inventory of avatar 1, if necessary (e.g. if the inventory is not stored in direct association with avatar 1). Wherever stored or found, the inventory is then loaded into menu 405 of the interface from which the resident associated with avatar 1 can select. (Selection can also be made from the rendering of the region prior to invoking the interface; in which case the item selected may be used for indexing into the menu of the interface, when invoked.) When a selection is made, the UUID and other metadata of the object or dependent avatar (or possibly island) is located and loaded into the UUID column of memory 305. The current registered owner is then loaded into the second column of memory 305. The metadata will also include the current location in the VU of the selected item which can be stored in the third column of memory 305. However, it should be noted in this regard that since avatar 1 is active in the VU and owns (or is otherwise responsible for) the item, avatar 1 can move the item freely in the VU and the location stored in the third column of memory 305 will be changed accordingly when the designation is completed and entered or applied (e.g. stored without taking action or making the designation effective). The time-out or expiration time or duration can be entered at 412 of the interface of FIG. 4 and stored in memory 305. The action to be taken in accordance with the designation being made and the action to be taken upon time-out may then be selected from menus 410, 410'. The intentionality flag, if provided, may also be set at any point during the designation process. This completes data entry for the data field of group 310 of memory 305.

Fields in groups 315 and 320 can then be populated in respective columns of the row corresponding to the object being designated. Specifically, a user will be selected from menu 420, preferably in accordance with a list of avatars specified as friends. Search engine 355 can be used as necessary to obtain needed data (e.g. the avatar's identification or UUID or the like) in accordance with selections made from menu 420. One or more actions that the selected avatar is permitted to perform in regard to the object being designated and any limitations thereon can then be selected from menus 415, 415', respectively, and the combinations of actions and limitations are stored in the column of group 315 of memory 305 corresponding to the selected avatar. In this case and under the above assumptions, avatar 2 would have permissions to pick up the object, move it, run associated scripts, add it to its own inventory if desired, or reject the designation, etc. and instructions could be provided, as well. Also under the above assumptions, avatar 3 might be granted permissions to pick up the object but not move it, manipulate it, run scripts, etc. In this regard, any permission provided in menu 415 could be entered as a prohibition by providing a "no" option in menu 415'.

Similarly, for the currently selected avatar, the preferred method of providing notification to the designee avatar may be specified such as providing a floating sign or bubble when the designated avatar is within a specified distance of the item. However, it is preferred to also accommodate preferences of the designee avatar in regard to notifications; which preferences are stored at memory 390. It is contemplated that either the stored preferences be used to populate menu 425, 425' from which the designating resident/user can select or, alternatively, to allow the designating resident/user to select from a full range of possible notification mechanisms (e.g. bubbles, billboards, floating signs, log-in notifications, e-mail outside the VU, and the like and compare the selections designated with the user preferences when corresponding notification conditions (425') are met to omit, modify or select from among the notification mechanism(s) preferred by the designee in order to configure the notification mechanism actually used. It is preferred that provision be made for the text of a notification to be freely specified by the designating user/resident since the notification, conceptually, is an invitation for the designee to use or interact with the item. For example, scripts that may be executed in regard to an item may be particularly interesting to a particular designee and the ability to refer to them in the notification may increase the likelihood of designee interaction with the item at an early opportunity.

Once the permissions/prohibitions and notifications entries have been made for the selected avatar, those entries can be entered or applied (e.g. by actuating buttons on the interface), another avatar selected for designation and the process repeated for another avatar and so on. All avatars for which a designation is not made are preferably treated as having default designation including minimal or no permissions and with notifications, if any, being limited to standard theft warnings, "not for you" bubbles, signs or billboards and the like. The completion of the designation may be indicated to the system by closing the interface after entering the designation. If the designation specified is merely applied, selections made and editing performed to date are merely stored and can be retrieved for further editing at another time. It may be useful or convenient in this regard, when a designation is only applied to arrange for setting I=0 (e.g. I must be set to 1 for the designation to be effective) or a similar flag provided and set accordingly.

Now, assuming that avatar 2 and avatar 3 are active on the VU when the designation is completed or at some time thereafter, their activity will be known to the VU system and a notification will be generated in a form most nearly matching the preferences of both the designating user/resident and the designee by alert/notification generator 360. Some mechanism for allowing the designee to reply or at least generate an acknowledgment when the notification has been received is preferably provided as indicated at 365 of FIG. 3.

It should be understood that inclusion of the present invention in a VU system does not alter the interaction of any avatar with the remainder of the VU system. That is, while a user/resident may be checked against an allowed list/blocked list or subscriber list much in the manner described above in regard to lists 345, 345', the lists against which a potential designee user may be checked may be different lists of authorized or prohibited users of the VU, in general, and not necessarily authorized or prohibited users of the present designation system if it is desired to allow for designation to any participant in the VU. On the other hand, it may be desirable to require a subscription and fee in order to have the ability to have a designation made to a particular VU user/resident and to receive notifications thereof, in which case, the user/resident would be checked against lists 345, 345', as well.

When an avatar of a user/resident (not necessarily a designated avatar, other than by default) is in the vicinity of a designated object (as is necessarily determined by known VU systems to limit processing for rendering), notifications may be made as alluded to above. If the avatar then seeks to interact with a designated item, commands for such interaction are then filtered at 370 against permissions stored for the respective avatar as stored in group 315 of memory 305. To improve response speed, it is considered to be preferable to load permissions from memory 305 to a buffer or cache storage 380 or the like based upon avatar proximity to the designated item. Thus data for comparison with avatar commands will be available when an avatar command is issued by the corresponding user/resident. If the commanded interaction is not permitted, the command is not performed (assuming the filtering arrangement 370 has not been circumvented in some way) and the user/resident associated with the avatar preferably informed of the lack of permission for the interaction requested. If the commanded interaction is permitted, the interaction may be immediately performed. Thus, since the designating user/resident may grant any permission including the permission for a designated avatar or a plurality of designated avatars to add the item to the designated avatar's own inventory while prohibiting other avatars from doing so direct, contemporaneous contact between avatars at a given location is not necessary for exchange of items between avatars as is required in known VU systems. By the same token, if the item is not transferred to the inventory of another avatar, the designating avatar can recover (e.g. pick-up) the item and return it to the original inventory or even provide for the item to be automatically returned (e.g. after time-out of the designation). Further, if a designated avatar is allowed to move an item from the location at which it was dropped by a designating avatar or otherwise manipulate it or change its properties, behaviors or characteristics but not add the item to the designated avatar's inventory, the designating avatar or its corresponding user/resident can track the location and or state of the item through the UUID of the item using search engine 355. Moreover, the ability to drop an item at a location to allow and, indeed, invite (through a notification which can be periodically repeated, as desired) another avatar to interact with it at a convenient later time much more closely simulates real world capabilities and thus enriches the VU experience while encouraging relationships among avatars and their corresponding users/residents.

In view of the foregoing, it is seen that the invention provides numerous capabilities and enhancements to flexibility of avatar actions not otherwise available in virtual universes as well as substantial enhancements to the VU experience for corresponding VU users/residents through providing for increased opportunities and encouragement for inter-avatar interactions. Specifically, the invention as described above, by providing a designation memory or even simply extending existing storage to include additional fields and providing for generation of notifications in any of several forms and under various conditions, provides for tagging of an item as being designated with attached permissions and prohibitions in regard to ways other avatars can interact with the item of any desired granularity as well as providing information in regard to the item, calling attention of other avatars to the item, and inviting shared experiences between avatars without the requirement of contemporaneous proximity of avatars. The invention particularly facilitates transfer or ownership of an item by avoiding a requirement of known VU systems that both avatars involved in an ownership transfer be concurrently present at a location.

While shown and described herein as a method and a system, it is understood that the invention further provides various alternative embodiments. For example, in one embodiment shown in FIG. 5, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method of designating items for transfer between avatars in a virtual universe without a requirement of concurrent presence of said avatars at a location, said method comprising the steps of:

using a computer hosting a virtual universe used by a plurality of users to permit a designating avatar to drop and leave an item at said location;

using said computer to assign a metadata identifier designating said item that is dropped and left by said designating avatar as tagged for permitted interaction by one or more designated avatars with said item to pick-up and add said item by one or more designated users to an inventory of one of said one or more designated avatars;

using a database accessible by said computer to store said metadata identifier;

using said computer upon or after said storing of said metadata identifier to send output to a user interface to inform said one or more designated users that the item has been tagged and specified for said permitted interaction to pick-up and add said item by said one or more designated users to said inventory of said one of said one or more designated avatars; and using said computer to allow only said one or more designated avatars, when said one or more designated avatars is at said location and when said item is not already picked-up, to perform said permitted interaction to pick-up and add said item to said inventory of said one of said one or more designated avatars, wherein said designating avatar is different from said one or more designated avatars.

2. The method as recited in claim 1, wherein said database is formed by configuring storage for metadata of the item to include additional fields.

3. The method as recited in claim 2, wherein said additional fields contain permissions and notifications specific to individual avatars or groups of avatars.

4. The method as recited in claim 3, including the further step of filtering avatar commands against said permissions and preventing performance of avatar commands which are not permitted under said metadata identifier.

5. The method as recited in claim 1, including the further step of tracking an item through said stored metadata identifier.

6. The method as recited in claim 1, including the further step of removing said metadata identifier from storage.

7. The method as recited in claim 6 wherein said metadata identifier is removed from storage upon a specified expiration time or duration.

8. A virtual universe system comprising:

a designation memory containing a metadata identifier for an item that is dropped and left at a location in the virtual universe by a designating avatar, said metadata identifier comprising a Universally Unique Identifier (UUID), an owner, a location, and at least one permission for one or more designated avatars to pick-up and add said item that is dropped and left by said designating avatar to an inventory of one of said one or more designated avatars, means for comparing an avatar command by said one or more designated avatars to add said item to said inventory of said one of said one or more designated avatars with said at least one permission in said designation memory and providing a comparison result, and means for causing performance of said avatar command by said one or more designated avatars to add said item to said inventory of said one of said one or more designated avatars based on said comparison result, said means for causing performance of said avatar command allowing only said one or more designated avatars, when said one or more designated avatars is at said location and when said item is not already picked-up, to pick-up and add said item to said inventory of said one of said one or more designated avatars, wherein said designating avatar is different from said one or more designated avatars.

9. The virtual universe system as recited in claim 8, wherein said designation memory comprises additional metadata fields in metadata storage for said item in said virtual universe.

10. The virtual universe system as recited in claim 8, wherein said metadata identifier further includes notification metadata specific to an avatar.

11. The virtual universe system as recited in claim 8, further including:
an interface for specifying information for fields of said metadata identifier.

12. The virtual universe system as recited in claim 8, further including
means for comparing an identification of an avatar to at least one of a subscriber list and an allowed list/blocked list for granting or denying access to said designation memory for storage of said metadata identifier.

13. The virtual universe system as recited in claim 8, wherein said metadata identifier includes an expiration time or duration for said metadata identifier.

14. A computer program product comprising a non-transitory computer readable medium storing program instructions for a data processing apparatus, said program instructions, when run on said data processing apparatus, causing said data processing apparatus to perform steps of:
permitting a designating avatar to drop and leave an item at a location in a virtual universe used by a plurality of users;
storing a metadata identifier corresponding to said item in a designation memory, said metadata identifier including at least one permission for one or more designated avatars to pick-up and add said item that is dropped and left by said designating avatar to an inventory of one of said one or more designated avatars;
generating a notification for said one or more designated users upon or after storing said metadata identifier corresponding to said item in said designation memory, said notification informing said one or more designated users of said at least one permission to pick-up and add said item to said inventory of said one of said one or more designated avatars; and
causing performance of an avatar command by said one or more designated avatars to add said item to said inventory of said one of said one or more designated avatars based on a comparison of said avatar command with said at least one permission of said metadata identifier in said designation memory, said causing step including allowing only said one or more designated avatars, when said one or more designated avatars is at said location and when said item is not already picked-up, to pick-up and add said item to said inventory of said one of said one or more designated avatars,
wherein said designating avatar is different from said one or more designated avatars.

15. The computer program product as recited in claim 14, wherein said program signals cause said data processing apparatus to further perform:
granting or denying authorization to perform said storing a metadata identifier based on comparison of an avatar identification with at least one of a subscriber list or an allowed list/blocked list.

16. The computer program product as recited in claim 14, wherein said program signals cause said data processing apparatus to further perform:
generation of an interface for specifying content of fields of said metadata identifier.

17. The computer program product as recited in claim 14, wherein said program signals cause said data processing apparatus to further perform
comparison of notification specifications in said metadata identifier with user preferences for notification.

18. A method of operating a virtual universe including configuring a data processing apparatus to include:
a designation memory containing a metadata identifier for an item that is dropped and left at a location in the virtual universe by a designating avatar, said metadata identifier comprising a Universally Unique Identifier (UUID), an owner, a location, and at least one permission for one or more designated avatars to pick-up and add said item that is dropped and left by said designating avatar to an inventory of one of said one or more designated avatars; and
a notification generator for notifying one or more users/residents of said virtual universe and corresponding to said one or more designated avatars upon or after storage of said at least one permission of said metadata identifier in said designation memory, said notification informing said one or more users/residents of said at least one permission to pick-up and add said item to said inventory of said one of said one or more designated avatars,
wherein said at least one permission allows only said one or more designated avatars, when said one or more designated avatars is at said location and when said item is not already picked-up, to pick-up and add said item to said inventory of said one of said one or more designated avatars, and
wherein said designating avatar is different from said one or more designated avatars.

19. The method as recited in claim 18, wherein said method further configures said data processing apparatus to include
an interface for specifying fields of said metadata identifier for storage in said designation memory.

20. The method as recited in claim 18, wherein said method further configures said data processing apparatus to include:
additional fields in metadata storage corresponding to said item for storing said metadata identifier.

21. A method of operating a virtual universe system on a plurality of networked data processors, said method comprising a step of:
configuring at least one data processor of said plurality of data processors to provide:
a designation memory containing a metadata identifier for an item that is dropped and left at a location in the virtual universe by a designating avatar, said metadata identifier comprising a Universally Unique Identifier (UUID), an owner, a location, and at least one permission for one or more designated avatars to pick-up and add said item that is dropped and left by said designating avatar to an inventory of one of said one or more designated avatars,
means for comparing an avatar command by said one or more designated avatars to add said item to said inventory of said one of said one or more designated avatars with said at least one permission in said metadata identifier and providing a comparison result, and
means for causing performance of said avatar command by said one or more designated avatars to add said item to said inventory of said one of said one or more designated avatars based on said comparison result, said means for causing performance of said avatar command allowing only said one or more designated avatars, when said one or more designated avatars is at said location and when said item is not already picked-up, to pick-up and add said item to said inventory of said one of said one or more designated avatars,
wherein said designating avatar is different from said one or more designated avatars.

* * * * *